Patented Oct. 23, 1951

2,572,823

UNITED STATES PATENT OFFICE 2,572,823

PROCESS FOR REDUCING FOAMING IN PROTEIN-CONTAINING MIXTURES

James S. Wallerstein and Ralph T. Alba, New York, N. Y., assignors to The Overly Biochemical Research Foundation, Inc., New York, N. Y., a corporation of New York No Drawing. Application September 28, 1944, Serial No. 556,302

14 Claims. (Cl. 195—29)

Our invention relates to a process for reducing the foaming of various protein-containing mixture during the agitation thereof, especially by bubbles or currents of gas, for mixing purposes, for promoting reaction, for aeration during fermentation, and for other uses wherein a protein-containing liquor is subjected to more or less lively agitation.

Our invention is of particular utility in reducing the foaming in the aeration of protein-containing mashes used as a culture medium for the development of microorganisms and for producing various products of fermentation, and will accordingly be described in detail in connection with such procedures.

As is known, various protein-containing mashes may be employed for the culture and commercial manufacture of microorganisms, such as feed yeast, or for special biochemical fermentations where the recovery of a specific end product formed by the microorganisms, for example glycerol, is desired. Where a protein-containing medium is employed for growth or fermentation purposes and is subjected to strong aeration to promote the growth and/or fermentation, a very abundant foaming is usually encountered. To combat this foaming, large and elaborate equipment, including baffles, are often resorted to, and various foam breakers, like fatty oils, are sometimes introduced into the liquor. The use of such foam breakers, however, is frequently ineffective, and is generally undesirable because the added foreign substance decreases the purity of the growth mixture and may interfere with the recovery of the desired end products. Baffles and other mechanical foam breaking equipment, on the other hand, have been found to be of limited value.

Although the foaming may be caused by a variety of substances, it is particularly marked when there are large concentrations of proteins in the culture or fermentation medium. We have discovered that the foam in a protein-containing medium may be greatly reduced during the course of a fermentation or growth of microorganisms if the mash is first digested enzymatically to cause break-down of a substantial part of the proteins in the mixture to simpler substances like peptides. The enzymes most suitable for this purpose are the tryptic enzymes, which are proteolytic in character, and among these enzymes those of the pancreas type, and specifically pancreatic protease, have been found to be especially effective as foam reducers, such enzymes converting the proteins, or a large part of them, into low molecular peptides. These enzymes of the pancreas type are distinguished from enzymes of the type of pepsin and papain which, while they hydrolize proteins, do not materially affect the degree of foam formation under conditions of aeration.

The amount of enzyme employed with any particular mash or culture liquid will be roughly proportional to the concentration of the proteins which it will be necessary to cleave and will be inversely proportional to the time allowed for digestion, but in any case, only small quantities of the enzyme will be required for commercial protein-containing liquors whether used for fermentation or for the growth of microorganisms or for other purposes. With the concentration of solids normally involved in fermentation and yeast-cultivating mashes, approximately one part of the tryptic enzyme to about one thousand parts of the mash will usually suffice. Where pancreatic protease is employed it is desirable to adjust the pH slightly to the alkaline side to secure optimum digestion. After the digestion is completed, the pH may be readjusted to the acid side if the process to which the mash is to be subjected requires or operates best under acid conditions.

An additional advantage of our preliminary treatment of the protein-containing liquors and mashes appears when the same are employed for fermentation or the cultivation of microorganisms, as the high molecular proteins are converted into a lower molecular state in which they are more readily available to the fermentation or growth organisms. In consequence, the growth of the organisms is aided and their desirable metabolic processes are stimulated. Moreover, high yields of the organisms are obtained in a shorter time.

The process of the present invention is of particular advantage where a protein-rich medium is employed for the growth of common yeast (Saccharomyces cerevisiae) or Torula utilis. In such processes the growth is appreciably stimulated, while foaming, which otherwise would cause marked difficulties, is greatly reduced.

A further valuable application of our process is in the production of fermentation glycerol, especially where the fermentation is carried out at more or less neutral pH's with strong aeration. By the predigestion, the fermentation is speeded and higher yields of yeast are obtained at the end of the fermentation process, which generally proceeds more vigorously than in the absence of the pretreatment.

The following examples describe the inven-

Example 1

A fermentation mesh was prepared by known saccharification procedures, the mash being comprised of one third wheat and two thirds malt. After boiling, the mash was cooled, the pH adjusted to 8.5 and divided into two parts of two liters each. One part was digested overnight at 40° C. in the presence of one part of pancreas to one thousand parts of mash, in the presence of a small amount of toluol to prevent bacterial infection. The other part was similarly treated but without addition of enzyme. The following day the toluol was removed by brief heating; both portions were cooled to 30° C. and adjusted to 12% original sugar. Five per cent magnesium carbonate (on sugar) and 5% brewer's yeast were added to two liter portions of the pancreas-treated and the untreated portions. Both were aerated by means of an aeration stone of one cubic inch with an airflow of one liter per minute. The portion which had not been digested with pancreas foamed violently and readily overflowed a 10-liter bottle, despite the addition of lard oil, mineral oil, castor oil, and other forms of foam breakers. The pancreas-digested portion formed no more than between one and two liters of foam continuously over a 12-hour period. After 12 hours, the pancreas-digested portion had fermented down to 3% sugar, while the non-digested portion had more than 4% remaining. In both cases, about 25% glycerol was formed on the basis of sugar fermented. About 5% more yeast was formed in the pancreas-treated portion as compared with the non-treated portion.

Example 2

A fermentation mash derived from wheat and malt was employed for the growth of *Saccharomyces cerevisiae*. One portion was digested overnight with pancreas, 1 part of the latter to 1,000 parts of mash, at 37° C. at pH 8. The following day, the pH was adjusted to 5.5 and the solid content to 10% prior to the addition of yeast. The other portion was similarly treated without addition of enzymes. The yeast was grown with strong aeration at 30° C. Considerably less foaming occurred in the pancreas-digested portion; the non-pancreas portion suffered repeated foaming-over despite the addition of lard oil and other foam breakers. After 10 hours, the yeast formed in the pancreas-digested portion was about 10% greater than in the control.

We claim:

1. In a process involving the addition of a culture of microorganisms to a protein-containing solution followed by aeration of the mixture to promote the action of the microorganisms, the step which comprises preliminarily subjecting the protein matter in the solution to the action of a tryptic enzyme until it has been converted in large part to peptides, whereby foaming of the solution during the subsequent aeration is reduced.

2. In a process involving the addition of a culture of microorganisms to a protein-containing solution followed by aeration of the mixture to promote the action of the microorganisms, the step which comprises preliminarily subjecting the protein matter in the solution to the action of a pancreatic protease until it has been converted in large part to peptides whereby foaming of the solution during the subsequent aeration is reduced.

3. The process according to claim 1, wherein the treatment with the tryptic enzyme is carried out at a slightly alkaline pH and thereafter the mixture adjusted to the acid side.

4. In a process involving the addition of a culture of microorganisms to a protein-containing cereal fermentation mash followed by aeration of the mixture to promote the action of the microorganisms, the step which comprises preliminarily subjecting such protein-containing solution to the action of a tryptic enzyme to cause a break-down of a substantial part of the proteins in the mixture to peptides, whereby foaming of the mash during the subsequent aeration is reduced.

5. In a process involving the addition of a culture of microorganisms to a protein-containing carbohydrate mash to cause fermentation thereof, followed by aeration of the mixture to promote the action of the microorganisms, the step which comprises preliminarily subjecting the mash to the action of a tryptic enzyme until a substantial part of the proteins in the mixture has been converted to peptides, whereby foaming of the mash during the subsequent aeration is reduced.

6. In a process for the fermentation of protein-containing carbohydrate mashes by the addition of yeast thereto followed by aeration of the mixture to promote growth of the yeast, the steps which comprise preliminarily digesting such a mash with pancreatic protease in the proportion of approximately one part of the enzyme to one thousand parts of the mash in the alkaline range, whereby foaming of the mash during the subsequent aeration is reduced, and thereafter adjusting the pH to the acid range.

7. In a process for the fermentation of protein-containing carbohydrate mashes by the addition of yeast thereto followed by aeration of the mixture for the production of glycerol, the step which comprises digesting such a mash, adjusted to the alkaline range, at approximately 40° C. in the presence of approximately one part of pancreatic protease to one thousand parts of mash, whereby foaming of the mash during the subsequent aeration is reduced.

8. A low-foaming nutrient culture medium for microorganisms, said medium being of carbohydrate-protein origin and containing pancreatic protease, the nitrogen compounds being mainly in the form of the lower peptides of low foaming capacity on aeration.

9. Process according to claim 4, wherein the culture medium is subjected to the action of pancreatic protease.

10. Process according to claim 4, wherein the culture medium is subjected to the action of pancreatic protease at a slightly alkaline pH, and thereafter is readjusted to the acid side.

11. Process according to claim 4, wherein the culture medium is inoculated with *Saccharomyces cerevisiae*.

12. Process according to claim 4, wherein the culture medium is inoculated with *Torula utilis*.

13. Process according to claim 1, wherein the protein-containing mixture is a mash derived from wheat.

14. Process according to claim 5, wherein the mash is subjected to the action of pancreatic protease.

JAMES S. WALLERSTEIN.
RALPH T. ALBA.

(References on following page)

REFERENCES CITED

The following references are of record in the file of this patent:

UNITED STATES PATENTS

| Number | Name | Date |
|---|---|---|
| 1,013,497 | Klopfer | Jan. 2, 1912 |
| 1,541,263 | Hoffman | June 9, 1925 |
| 1,754,825 | Heuser | Apr. 15, 1930 |
| 2,051,017 | Schwarz | Aug. 11, 1936 |
| 2,110,613 | Swenson | Mar. 8, 1938 |
| 2,219,668 | Underkofler | Oct. 29, 1940 |
| 2,289,808 | Severson | July 14, 1942 |

FOREIGN PATENTS

| Number | Country | Date |
|---|---|---|
| 778 | Great Britain | of 1880 |
| 3,776 | Great Britain | of 1879 |
| 14,459 | Great Britain | of 1887 |

OTHER REFERENCES

Enzymes, by Sumner and Somers, 1943 ed., page 137.

Wahl-Henius: American Handbook of Brewing and Malting, vol. 2, (3 ed.), Chicago, Wahl-Henius Institute, 1908, pages 1046 to 1051.